United States Patent
Mattelet et al.

(10) Patent No.: US 11,097,671 B2
(45) Date of Patent: Aug. 24, 2021

(54) CENTER CONSOLE FOR VEHICLE

(71) Applicant: AGC GLASS EUROPE, Louvain-la-Neuve (BE)

(72) Inventors: Claire Mattelet, Brussels (BE); Pierre Humblet, Ohain (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 15/745,285

(22) PCT Filed: Jul. 12, 2016

(86) PCT No.: PCT/EP2016/066497
§ 371 (c)(1),
(2) Date: Jan. 16, 2018

(87) PCT Pub. No.: WO2017/012913
PCT Pub. Date: Jan. 26, 2017

(65) Prior Publication Data
US 2018/0208131 A1    Jul. 26, 2018

(30) Foreign Application Priority Data
Jul. 17, 2015   (EP) .................................. 15177243

(51) Int. Cl.
| B60R 13/02 | (2006.01) |
| C03C 3/087 | (2006.01) |
| B60R 7/04  | (2006.01) |
| C03C 3/085 | (2006.01) |
| C03C 3/091 | (2006.01) |

(52) U.S. Cl.
CPC ............ B60R 13/0262 (2013.01); B60R 7/04 (2013.01); C03C 3/085 (2013.01); C03C 3/087 (2013.01); C03C 3/091 (2013.01); *B60R 2013/0287* (2013.01)

(58) Field of Classification Search
CPC ... B60R 7/04; B60R 11/0229; B60R 11/0235; B60R 11/0264; B60R 13/0262; B60N 2/797; B60N 2/767
USPC ...................................................... 296/24.34
See application file for complete search history.

(56) References Cited

U.S. PATENT DOCUMENTS

| 5,609,382 A * | 3/1997 | Schmid ..................... B60R 7/04 224/539 |
| D385,847 S * | 11/1997 | Ma .............................. D12/415 |
| 6,123,377 A | 9/2000 | Lecher et al. |

(Continued)

FOREIGN PATENT DOCUMENTS

| WO | 2010/081156 A1 | 7/2010 |
| WO | WO-2014/0128016 A1 * | 8/2014 |

OTHER PUBLICATIONS

Machine Translation of WO-2014/0128016-A1, printed from the EPO website on Oct. 31, 2019.*

(Continued)

*Primary Examiner* — Jason S Morrow
(74) *Attorney, Agent, or Firm* — Oblon, McClelland, Maier & Neustadt, L.L.P.

(57) ABSTRACT

The invention relates to a center console (1) for a vehicle comprising a console body (3) and an upper part (11) provided on the console body (3) on which functional elements and at least one trim element (2) are mounted. According to the invention, the at least one trim element (2) is made of glass sheet.

18 Claims, 1 Drawing Sheet

(56) References Cited

U.S. PATENT DOCUMENTS

| | | | |
|---|---|---|---|
| 9,576,755 B2* | 2/2017 | Haag | B29C 45/14639 |
| 2011/0091704 A1 | 4/2011 | Akiba et al. | |
| 2012/0133169 A1 | 5/2012 | George et al. | |
| 2013/0201613 A1 | 8/2013 | Akiba et al. | |
| 2014/0262722 A1* | 9/2014 | Haag | B29C 45/14639 |
| | | | 200/600 |
| 2015/0115641 A1* | 4/2015 | Inoue | B60R 7/04 |
| | | | 296/37.8 |
| 2017/0057205 A1* | 3/2017 | Notsu | B32B 17/10036 |
| 2017/0059749 A1* | 3/2017 | Wakatsuki | C03C 3/083 |
| 2017/0349473 A1* | 12/2017 | Moriya | C03B 23/03 |
| 2018/0111569 A1* | 4/2018 | Faik | B60K 35/00 |
| 2018/0148368 A1* | 5/2018 | Gomez | B32B 17/10036 |
| 2018/0208494 A1* | 7/2018 | Mattelet | C03C 3/087 |
| 2018/0264799 A1* | 9/2018 | Ito | B41M 1/12 |
| 2018/0273422 A1* | 9/2018 | Hori | C03C 21/002 |
| 2018/0327301 A1* | 11/2018 | Fujii | C03B 23/0235 |
| 2018/0333948 A1* | 11/2018 | Matsuda | B41F 15/0895 |
| 2019/0077262 A1* | 3/2019 | Benjamin | B60K 35/00 |

OTHER PUBLICATIONS

International Search Report dated Sep. 13, 2016 in PCT/EP2016/066497, filed on Jul. 12, 2016.

* cited by examiner

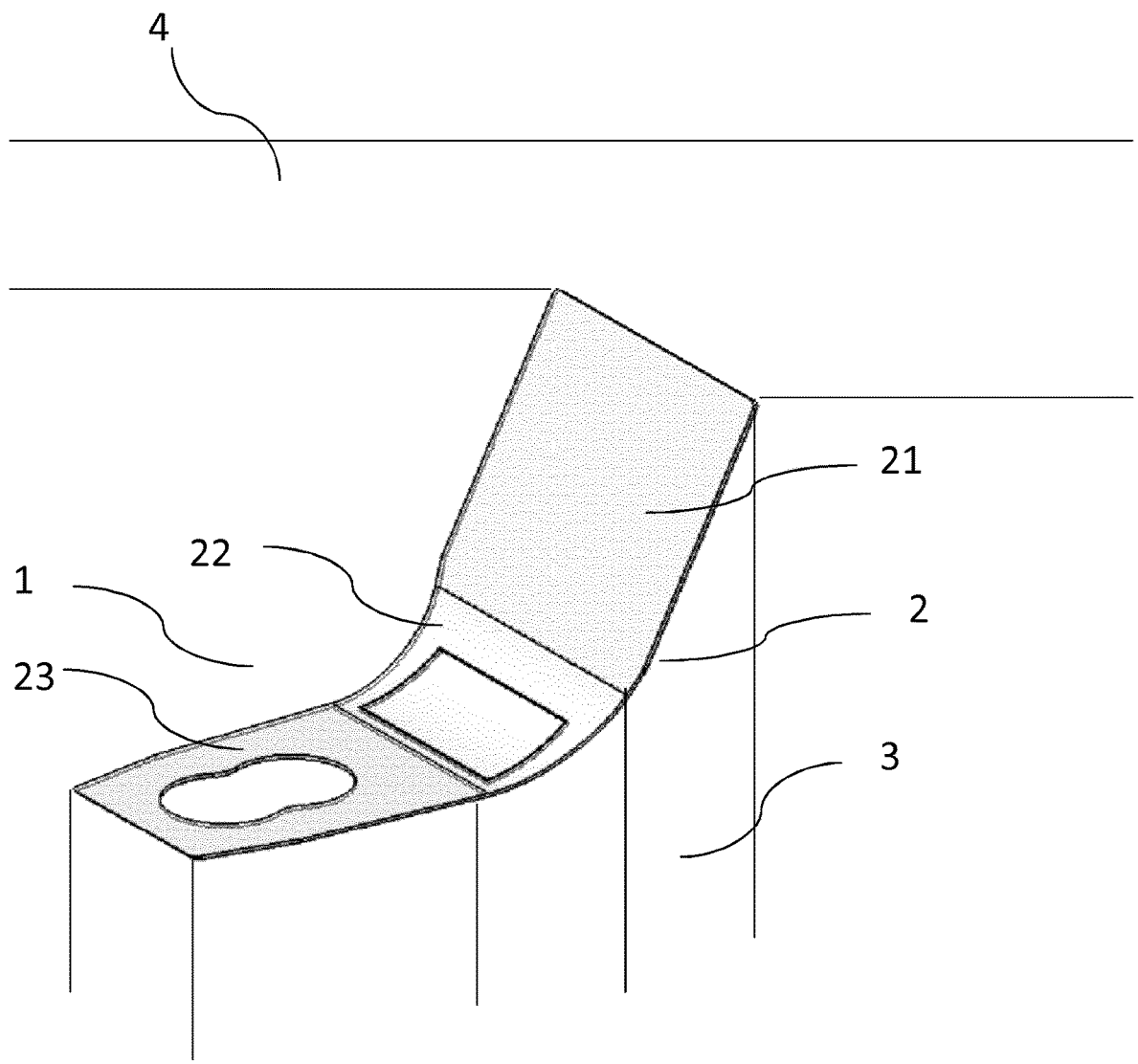

CENTER CONSOLE FOR VEHICLE

The present invention relates to a center console for a motor vehicle, comprising a console body and trim elements mounted on the console body.

In many vehicles, a vehicle console is disposed between left and right front seats. Typically, the center console is anchored to the dashboard of the car and extends on that part. The center console can also be installed to the left and right of the back seats. In order to make the interior of the car more beautiful and comfortable, usually decorated panels covering the exposed parts of the center console (such as a CD player, controls for audio, climate, the infotainment etc. . . . ) are mounted on the center console and particularly on the upper side of the center console.

Generally, the top part of the center console is made of plastics, polycarbonate elements (plastics materials are used as a cover to the whole console system). This solution is often aesthetic but does not allow adding directly some functions on the center console as such "touch screen functionalities" . . . . Furthermore, the disadvantages of having a plastics molded center console are the following: since there is no touch functionality permitted with plastics, an overload of useless buttons must be installed on the console. At the end of the day, the multitude of buttons confuses the driver (safety aspect). Additionally, because there is no seamless effect, it is more difficult to clean the center console as the dust is incrusted around the buttons, etc. . . . (hygiene downside). The plastic material used to cover the center console is hardly recyclable whereas glass is endlessly recyclable (environmental issue). The molding process of the plastic parts results in plastics ending up as wastes (recyclable plastics prices are not competitive with newer plastics prices, therefore there is currently no viable alternative to address this environmental concern). In general, plastics material used a glass cover are not highly resistant to UV and the transparent tint turns into yellow with time (deterioration of the design). Additionally, in order to present a similar stiffness than glass, a cover made of plastics will be heavier than one made of glass. Therefore, plastics material solutions are not optimal for this car part in order to lighten the car. As technology cycles go faster and faster, a glass center console would allow flexibility for IT upgrades to be made and allows for seamless connectivity with nomadic devices. By having a glass center console, it would allow to reconcile the many different softwares that are typically supported by the car into one Operating System located and commanded from the same place. Additionally, in contrast to most of the materials currently used as parts of the center console, glass can support the use of ambient light (improving the comfort/convenience of the passengers). Furthermore, the passenger does not want to see anymore plastic in his interior's car similarly to his house or his office interior's.

Furthermore, the center consoles of the prior art are rather sensitive to scratches.

In view of the foregoing prior art problems, it is an object of the present invention to provide an improved vehicle center console with a good aesthetic and more resistant to scratches than center console of the prior art.

Thus, the present invention relates to a console body including a console base and an upper part provided on the console base on which at least trim elements are mounted.

According to the invention, the at least one trim element is made of glass sheet.

According to the invention, the console body is mounted on the floor panel of the vehicle. Generally, the console body includes a console base mounted on the floor panel, left and right support frames extending upward from left and right side portions of the console base section.

Generally, on the upper side of the console body, functional parts and trim elements are attachable. Trim elements are generally attached to cover or surround some functional parts (such as a CD player, air conditioning controllers, etc. . . . ).

According to one embodiment of the invention, trim elements extend from the rear of the center console to the dashboard of the vehicle. The terms front and rear in the context of the present invention, relate to a front end and rear end of the motor vehicle.

According to another embodiment of the invention, the functional parts may be directly managed from the trims elements thanks to "touch function" providing a touch panel. Thus, the trims elements made of glass sheet may host different functionalities around electronic gadgetry and vehicle control information, connectivity, touch, display and audio. Thus the upper part of the center console may be made of glass sheet in a larger part of the upper part of the center console, without anesthetically buttons to control for example audio control volume and on/off, engine start/stop system, head up display control system, glazing opening, Display system control, allows circulation of information display in the car on the different glass panels, control of SPD glazings, etc. According to this embodiment, the touch panel may be curved for improved ergonomics conditions of drivers/passengers (view adaptation and glare related issues). Cavities on trim elements can be processed to provide haptic feedback on a plain glass sheet for easy detection of touch sensors (for safety reason of the driver).

In a preferred embodiment of the invention, the trim elements are made in one piece of glass sheet extended from the rear of the console body to the dashboard wherein touch functions are integrated.

The trim elements may be extended to a display panel provided on the dashboard thus given the sensation to have only one piece of glass sheet from the rear of the center console to the dashboard.

According to another embodiment of the invention, center console can be made of several pieces of glass sheet, depending on the needs for harbouring functions.

According to another embodiment of the invention, some lighting means as for example OLED, LED, special glass paint/enamel backing, may be integrated into the center console or on its edges.

In another preferred embodiment of the invention, the trim elements are made in one piece of glass sheet extended from the rear of the console body to the dashboard wherein openings are arranged to provide an access to functional parts. Such openings may be covered by openable piece of glass sheet.

According to one embodiment of the invention, the trim elements may be glued or fixed to the console body by encapsulation.

Advantageously, the center console has an upward opening and capable of storing therein baggage providing a storage compartment. For opening the storage compartment of the console body, the vehicle center console has a first opening mode for opening the compartment of the console base by for example, sliding the trim elements. Then, the storage compartment lid is made of glass sheet and can be encapsulated for instance with PU, TPE, PVC, LCP, TPO or similar materials in order to be flush with the rest of the center panel when closed. This encapsulation is not limited to this area of the center console.

According to the invention, the center console is made of flat glass sheet which can be bended or thermoformed to adapt with the shape of the car. The flat glass sheet may be processed to be decorative or in order to give an access to CD, plugs, storage compartment, cup holders systems, buttons, gearstick, cigarette lighter or auxiliary power point, audio controls, the climate control/air condition system and possibly a display screen (or other type of system requiring a hole drilled in the glass sheet surface).

The glass according to the invention is made of glass which can belong to various categories. The glass can thus be a glass of soda-lime-silica, aluminosilicate or borosilicate type, and the like. Preferably and for reasons of lower production costs, the glass sheet according to the invention is a sheet of soda-lime-silica glass.

In one nonlimiting embodiment, the basic composition of the glass according to the invention comprises, in a content expressed as percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

In another embodiment, the basic composition of the glass according to the invention comprises, in a content expressed as percentages by total weight of glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |

In another embodiment and for reasons of lower costs, the glass is a soda-lime glass. Advantageously, the basic composition of the glass according to the invention comprises, in a content expressed as percentages by total weight of glass:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5%. |

According to an advantageous embodiment of the invention, the composition of the glass sheet may additionally comprise one or more component (s)/colorant(s) in an appropriate amount as a function of the effect desired. This/these component (s)/colorant(s) may be used, for example, to "neutralize" the colour generated by for example the presence of the chromium and thus to render the colouring of the glass of the invention more neutral or colourless. Alternatively, this/these colorant(s) may be used to obtain a desired colour other than that which can be generated by for example the presence of the chromium.

In a preferred embodiment of the present invention, and particularly when touch functions are expected on the glass sheet of the center console, the glass sheet preferably has special enhanced infrared transmission properties in order to enhance the performances of the glass. By virtue of its high transmission of infrared radiation, a such glass sheet may advantageously be used in a touchscreen or touch panel or touchpad using the Planar Scatter Detection (PSD) or Frustrated Total Internal Reflection (FTIR) optical technology to detect the position of one or more objects (for example a finger or a stylus) on a surface of the said sheet. Thus, a solution proposed in the present invention to provide a glass with a high reflection in infrareds (RIR) consists of integrating in the glass composition chromium in a specific range contents.

Thus, according to one embodiment of the present invention, the glass sheet preferably has a composition which comprises a content expressed as percentages by total weight of glass:

| | |
|---|---|
| Total Iron (expressed in the form of $Fe_2O_3$) | 0.002-0.06% |
| $Cr_2O_3$ | 0.0001-0.06%. |

Such glass compositions combining low content of iron and chromium have shown some particularly good performances in terms of infrared reflection (RIR) and show a high transparency in the visible. These compositions are described for example in the following documents: WO-2014128016A1, WO2014180679A1, WO2015011040A1, WO2015011041A1, WO2015011042A1, WO20150-11043A1 and WO2015011044A1.

According to another embodiment of the present invention, the glass sheet has a composition which comprises:

| | |
|---|---|
| Total Iron (expressed in the form of $Fe_2O_3$) | 0.002-0.06% |
| $Cr_2O_3$ | 0.0015-1% |
| Co | 0.0001-1%. |

Such chromium and cobalt based glass compositions have shown particularly good performances in terms of infrared reflection RIR while offering interesting possibilities in terms of aesthetics/color (from blue to intense coloration neutrality or up opacity). Such compositions are described in European patent application No. 13 198 454.4.

According to another embodiment of the present invention, the glass sheet has a composition which comprises a content expressed as percentages by total weight of glass:

| | |
|---|---|
| Total iron (expressed in the form of $Fe_2O_3$) | 0.02-1% |
| $Cr_2O_3$ | 0.002-0.5% |
| Co | 0.0001-0.5%. |

Preferably, in this embodiment, the composition comprises 0.06%<total iron≤1%.

Such compositions based on chromium and cobalt are used to obtain colored glass sheets in the blue-green range, comparable in terms of color and light transmission with blue and green glasses on the market, but with performance particularly good in terms of infrared reflection. Such compositions are described in European patent application EP15172780.7.

According to another embodiment of the present invention, the glass sheet has a composition which comprises a content expressed as percentages by total weight of glass:

| | |
|---|---|
| total iron (expressed in the form of $Fe_2O_3$) | 0.002-1% |
| $Cr_2O_3$ | 0.001-0.5% |
| Co | 0.0001-0.5%. |
| Se | 0.0003-0.5%. |

Such glass compositions based on chromium, cobalt and selenium have shown particularly good performances in terms of infrared reflection while offering interesting possibilities in terms of aesthetics/color (gray neutral to slight staining intense in the gray-bronze range). Such compositions are described in European patent application EP15172779.9.

According to another embodiment of the invention, the composition of the glass sheet comprises the following in weight percentage, expressed with respect to the total weight of glass:

$65 \leq SiO_2 \leq 78\%$
$5 \leq Na_2O \leq 20\%$
$0 \leq K_2O < 5\%$
$1 \leq Al_2O_3 < 6\%$
$0 \leq CaO < 4.5\%$
$4 \leq MgO \leq 12\%$;
as well as a ($MgO/(MgO+CaO)$) ratio$\geq 0.5$.

In another embodiment of the invention, the composition of the glass sheet comprises the following in weight percentage, expressed with respect to the total weight of glass:

$65 \leq SiO_2 \leq 78\%$
$5 \leq Na_2O \leq 20\%$
$1 \leq K_2O < 8\%$
$1 \leq Al_2O_3 < 6\%$
$2 \leq CaO < 10\%$
$0 \leq MgO \leq 8\%$;
a $K_2O/(K_2O+Na_2O)$ ratio of from 0.1 to 0.7.

Some others composition of glass may be used, such compositions are for example described in the following documents: EP14 167 942.3, EP14 177 487.7.

According to another advantageous embodiment of the invention, which may be combined with the preceding embodiment, the glass sheet can be coated with a layer or a film which makes it possible to modify or neutralize the colour which may be generated by for example the presence of the chromium (for example a coloured PVB film).

The glass sheet according to the invention may advantageously be chemically or thermally tempered in order to avoid scratches and to enhance the resistivity of the upper part of the center console.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. A textured glass sheet may be also used to limit the reflection inside the vehicle. Etching or coating techniques may as well be used in order to avoid reflection.

According to another embodiment, the glass sheet is coated with at least one anti-fingerprint layer or has been treated so as to reduce or prevent fingerprints. This embodiment is also advantageous in the case of use of the glass sheet of the invention as front face of a touchscreen. Such a layer or such a treatment may be combined with a transparent and electrically conducting thin layer deposited on the opposite face. Such a layer may be combined with an antireflection layer deposited on the same face, the anti-fingerprint layer being on the outside of the stack and thus covering the antireflection layer.

According to the applications and/or properties desired, other layers can be deposited on one and/or the other face of the glass sheet according to the invention.

The glass sheet according to the invention may be a glass sheet obtained by a floating process, a drawing process, a rolling process or any other process known to manufacture a glass sheet starting from a molten glass composition. According to a preferential embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have a thickness varying between 0.1 and 25 mm. Advantageously, in the case of the application of touch panels, the glass sheet according to the invention can have a thickness varying between 0.1 and 6 mm. Preferably, in the case of the touch screens application, for reasons of weight, the thickness of the glass sheet according to the invention is from 0.1 to 2.2 mm.

According to the invention, the glass sheet presents a curvature to correctly fit with the upper part of the center console and its particular design.

In order to provide a better esthetic of the center console, the trim elements may be made of a digital or silk screen printed glass sheet, an etched glass sheet, a painted/enameled glass sheet, a casted glass sheet, an anti-bacterial glass sheet, a colored float glass sheet.

According to another embodiment of the invention, the trim elements are made of laminated glass sheet. According to this embodiment, at least one thermoplastic interlayer is used to laminate at least two glass sheets. Advantageously, a colored or active interlayer may be present between the at least two glass sheets. The interlayer or a layer between the glass and the interlayer might have a low refractive index (<1.43, <1.4, <1.38, . . . <1.3) to ensure TIR in the upper glass, if compatible from IR absorption point of view.

According to another embodiment of the invention, the at least one trim element is made of heat treated glass sheet, for example annealed or tempered and/or bended glass sheet. Typically, this involves heating the glass sheet (coated or not) in a furnace to a temperature of at least 580° C., more preferably of at least about 600° C. and still more preferably of at least 620° C. before rapidly cooling down the glass substrate. This tempering and/or bending can take place for a period of at least 4 minutes, at least 5 minutes, or more in different situations.

Thus, a center console comprising at least trim element made of glass sheet according to the invention may provide a center console having one or more of the following advantages:

a higher mechanical/scratch resistance
an improved stiffness/weight ratio
a higher resistance to ageing/weathering (sun irradiation)
possibility to provide a better finishing/aspect
possibility to have a transparent trim element (for back lighting, screen integration, . . . )
possibility to have a glare control treatment and/or anti-finger prints coating
a better recyclability
a seamless connectivity with nomadic devices
the glass trim element can harbor seamless audio functions (audioglass)
a better hygienic aspect
a better comfort/convenience
some functionalities may be tailor-made for the occupant
possibility of reconciliation of many different softwares into one single place for one Operating System.

The present invention applies to trim or decorative elements present in the interior of a vehicle as doors handles contours, door panels, trim elements of the dashboard, back of seats . . . .

The following FIG. 1 illustrates the invention, without the intention of in any way limiting its coverage.

The FIG. 1 illustrates a center console 1 of a vehicle with a console body 3 and at least one trim element 2 disposed on the upper part of the console body 3 according to one embodiment of the invention. As showed in this FIGURE, the trim element 2 extends from the rear part of the center console placed between the left and right front seats (not shown) to the lower part of the dash board 4. In this example embodiment, three trim elements 21, 22 and 23 are used to cover the upper part of the center console. It is understood that the console body 3 and trim element 2 may extend between the left and right back seats The upper trim element 21 covers the upper part of the center console from the mid part of the center console to part just above the dashboard (4). This trim element 21 may be flat or with a weak curvature. Some access to functional parts may be provided through this trim element 21. The middle part 22 presents a curvature to correctly fit with the design of the center console. In this FIGURE, the part 22 shows an opening to have an access to functional buttons to control for example sound, air conditioning . . . . The opening may be covered by another piece of glass sheet which may be openable, for example by a sliding movement. However, in one other embodiment of the invention, the functional buttons placed into the trim elements 21 and/or 22 may be replaced by touch functions with lead to suppress anesthetic functional buttons which generally protrude from the center console. Finally, the third trim element 23 covers the part located between the left and right front seats. This trim element in this specific embodiment presents some holes for example storage compartment or for cup holders systems.

In one embodiment, a storage compartment may be provided between the left and right front seats. In a preferred embodiment, the storage compartment is cover by a fourth trim element made also of glass sheet, corresponding to an openable lid. Then, the trim element 23 may preferably extends to the compartment lid.

In another embodiment of the invention, the upper trim element 21 extends to the dashboard and integrates a display panel as such a GPS, CD/audio player screen . . . .

According to the invention, the trim elements 21 and so one are made of glass sheet. Preferably, the trim elements are made of a soda-lime-silica as described above It is understood that the different trim elements 21 to 23 may be made of the same glass or may be different to answer to different specifications requested by the car maker. For example, the trim element 21 may be a touch panel and the trim element 22 may be a colored glass. The trim element 23 which may extend to the compartment lid may present a pattern or specific coating to protect more the lid compartment . . . .

It is understood from the present invention, the trim elements 21 to 21 or others may be made in one piece of glass sheet.

According to the invention, the at least one trim element 21, 22, 23 . . . may be glued, screwed or fixed by any suitable method to the upper part of the center console 1.

The invention claimed is:

1. A center console for a vehicle comprising:
a console body; and
an upper part provided on the console body on which functional elements and at least one trim element are mounted,
wherein the at least one trim element is made of glass sheet,
wherein the trim element extends to a dashboard and/or back seats of the vehicle,
wherein the trim element does not comprise a door panel,
wherein the glass sheet is formed from a float glass sheet that comprises, in a content expressed as percentages by total weight of glass:

| | |
|---|---|
| $SiO_2$ | 55-85%, |
| $Al_2O_3$ | 0-30%, |
| $B_2O_3$ | 0-20%, |
| $Na_2O$ | 0-25%, |
| CaO | 0-20%, |
| MgO | 0-15%, |
| $K_2O$ | 0-20%, |
| and | |
| BaO | 0-20%, | wherein the glass is a glass of soda-lime-silica.

2. The center console according to claim 1, wherein the glass comprises, in a content expressed as percentages by total weight of glass:
65≤$SiO_2$≤78%,
5≤$Na_2O$≤20%,
0≤$K_2O$<5%,
1≤$Al_2O_3$<6%,
0≤CaO<4.5%,
4≤MgO≤12%,
as well as a (MgO/(MgO+CaO)) ratio≥0.5.

3. The center console according to claim 1, wherein the at least one trim element extends over a majority of a surface of an upper part of a console base.

4. The center console according to claim 1, wherein the functional elements are integrated into the at least one trim element.

5. The center console according to claim 1, wherein the trim element comprises touch functionalities.

6. The center console according to claim 1, wherein the trim element is at least partially openable.

7. The center console according to claim 1, wherein the trim element is made of a laminated glass and/or tempered glass.

8. The center console according to claim 1, wherein the trim element is bent.

9. The center console according to claim 1, wherein the trim element is made of a coated glass.

10. The center console according to claim 1, wherein the trim element comprises flat and curved parts.

11. The center console according to claim 1, wherein the trim element has a thickness between 0.2 to 6 mm.

12. The center console according to claim 1, wherein the trim element extends from a rear part of the center console to a dashboard.

13. The center console according to claim 1, wherein the trim element extends to a back seat of the vehicle.

14. The center console according to claim 5, wherein the trim element comprises, in a content expressed as percentages by total weight of the glass:
Total iron (represented in the form of $Fe_2O_3$) 0.002-0.06%
$Cr_2O_3$ 0.0001-0.06%.

15. A center console for a vehicle comprising:
a console body; and
an upper part provided on the console body on which functional elements and at least one trim element are mounted,
wherein the at least one trim element is made of glass sheet,
wherein the trim element extends to a dashboard and/or back seats of the vehicle,
wherein the trim element is bent or defines one or more holes,
wherein the glass sheet is formed from a float glass sheet that comprises, in a content expressed as percentages by total weight of glass:

| | |
|---|---|
| $SiO_2$ | 55-85%, |
| $Al_2O_3$ | 0-30%, |
| $B_2O_3$ | 0-20%, |
| $Na_2O$ | 0-25%, |
| CaO | 0-20%, |
| MgO | 0-15%, |
| $K_2O$ and | 0-20%, |
| BaO | 0-20%, | wherein the glass is a glass of soda-lime-silica.

16. The center console according to claim 1, wherein the trim element defines one or more holes.

17. The center console according to claim 15, wherein the trim element does not comprise a door panel.

18. The center console according to claim 1, wherein the trim element comprises a single piece of glass that forms part of the center console and extends to the dashboard and integrates a display panel.

* * * * *